United States Patent [19]

Jansen et al.

[11] Patent Number: 5,118,408
[45] Date of Patent: Jun. 2, 1992

[54] REDUCING THE WATER AND SOLIDS CONTENTS OF BITUMEN FROTH MOVING THROUGH THE LAUNDER OF A SPONTANEOUS FLOTATION VESSEL

[75] Inventors: Wayne B. Jansen; Gordon R. Thompson, both of Edmonton; Patrick D. Dougan, Sherwood Park; Malcolm S. Betts; Gordon R. Larson, both of Fort McMurray, all of Canada

[73] Assignees: Alberta Energy Company, Limited; Canadian Occidental Petroleum Limited; Esso Resources Canada Limited, all of Calgary; Gulf Canada Resources Limited, Toronto; Her Majesty the Queen, in right of the Province of Alberta, Edmonton; HBOG-Oil Sands Limited Partnership, Calgary; PanCanadian Petroleum Limited, Calgary; Petro-Canada, Inc., Calgary, all of Canada

[21] Appl. No.: 755,993

[22] Filed: Sep. 6, 1991

[51] Int. Cl.⁵ .................. B03D 1/10; C10G 33/08; C10G 1/00
[52] U.S. Cl. .................. 209/164.000; 209/168; 209/10; 208/390; 208/391; 208/425; 196/14.52; 210/744; 210/703; 210/221.2; 210/114
[58] Field of Search ............... 209/164, 168, 10, 170; 208/425, 390, 391, 187; 196/14.52; 210/744, 703, 221.2, 114, 112, 104

[56] References Cited

U.S. PATENT DOCUMENTS

| | | | |
|---|---|---|---|
| 3,012,672 | 12/1961 | Ziemer | 209/170 |
| 3,339,345 | 9/1967 | Sebald | 209/170 |
| 3,375,928 | 4/1968 | Chase | 210/114 |
| 3,443,692 | 5/1969 | Halsey | 210/114 |
| 3,471,010 | 10/1969 | Pick | 209/168 |
| 3,607,720 | 9/1971 | Paulson | 208/425 |
| 4,401,552 | 8/1983 | Elauchenny | 208/425 |
| 4,436,617 | 3/1984 | Moore | 209/170 |
| 4,545,892 | 10/1985 | Cymbalisty | 209/170 |
| 4,648,964 | 3/1987 | Leto | 208/391 |
| 4,859,317 | 8/1989 | Shelfantook | 208/425 |

FOREIGN PATENT DOCUMENTS

| | | | |
|---|---|---|---|
| 857306 | 12/1970 | Canada | 208/425 |
| 1152918 | 8/1983 | Canada | 208/391 |
| 2097689 | 11/1982 | United Kingdom | 210/744 |

Primary Examiner—Ivars Cintins
Assistant Examiner—Thomas M. Lithgow
Attorney, Agent, or Firm—Millen, White & Zelano

[57] ABSTRACT

An aperature is formed in the bottom wall of the launder. A downwardly extending container communicates with the aperture. A weir is positioned immediately downstream of the aperture. The container and weir combine to form a separator. In the launder, free water and solids contaminants settle and form a bottom layer of dirty water. The layer is diverted into the container through the aperture and the weir temporarily retains a small head of it. Temporary retention in the separator therefore generates a vertical fluid column comprising an upper layer of relatively clean froth and a lower layer of dirty water, said layers having an ascertainable interface. The elevation of the interface is monitored and contaminated fluid is withdrawn from the container as underflow at a rate controlled to keep the interface elevation substantially constant. The froth overflowing the weir is reduced in water and solids relative to the original froth issuing from the flotation vessel.

2 Claims, 4 Drawing Sheets

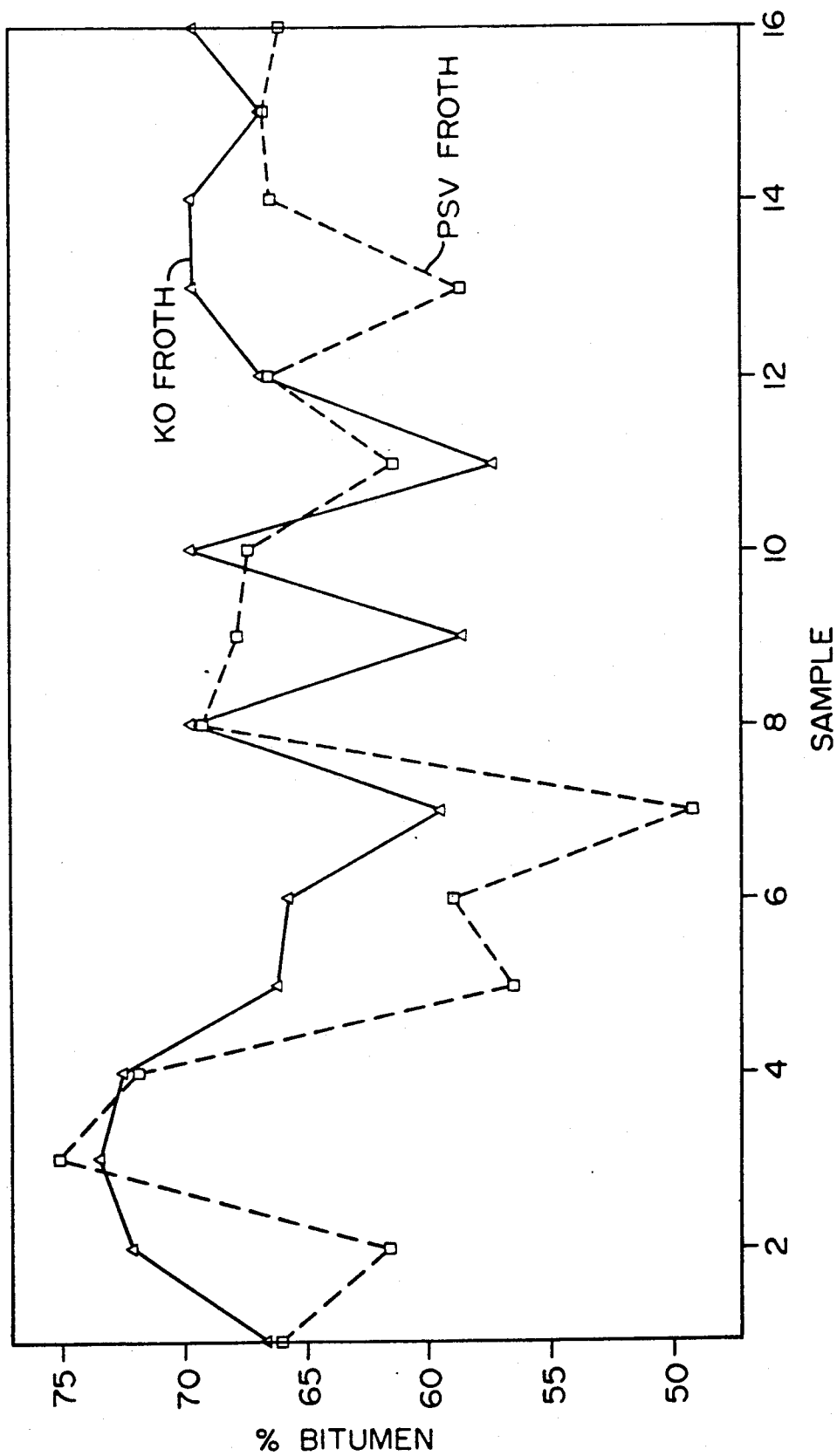
Fig. 2. PSV and Water Knock-Out Froth Quality

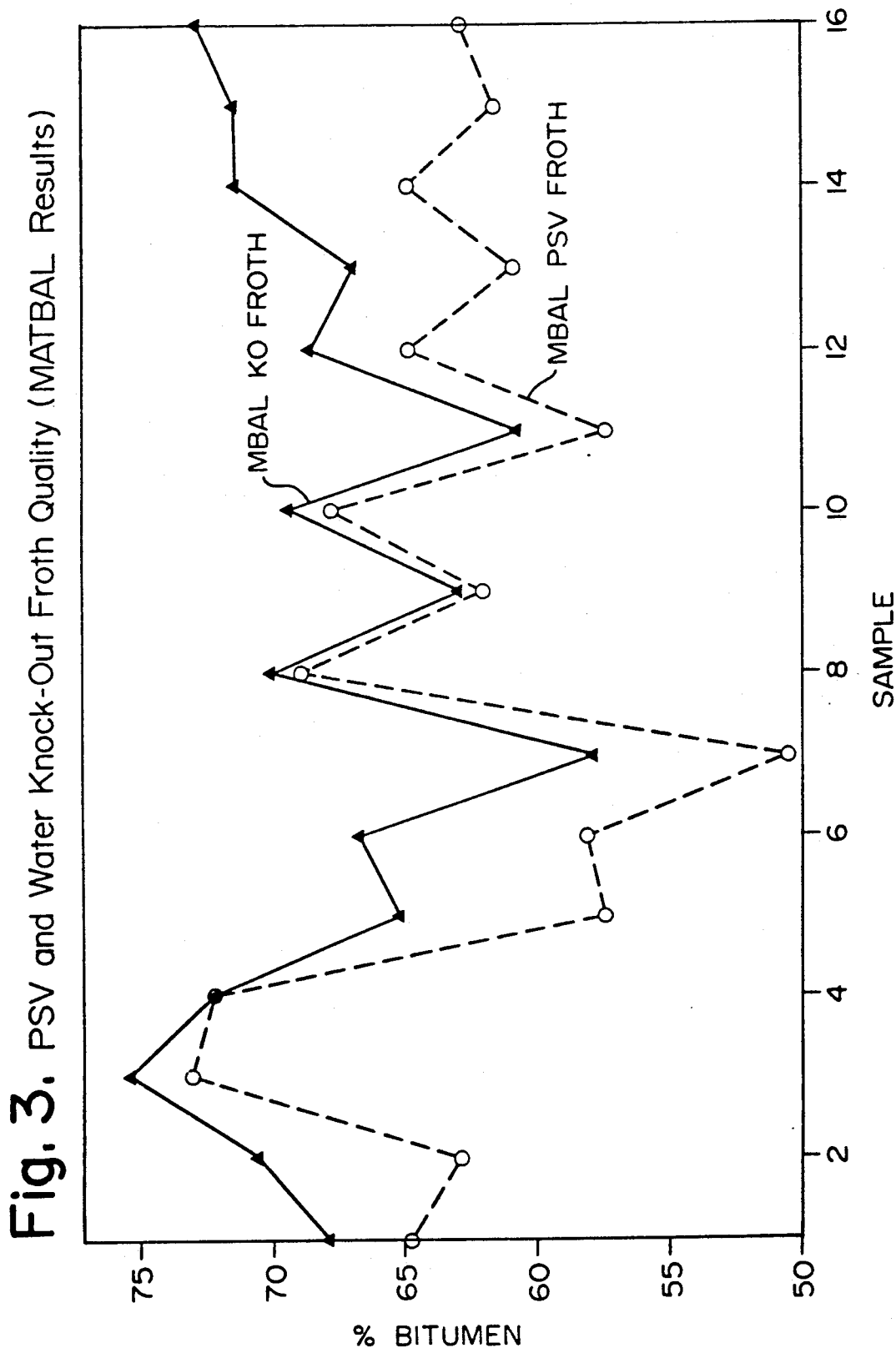
Fig. 3. PSV and Water Knock-Out Froth Quality (MATBAL Results)

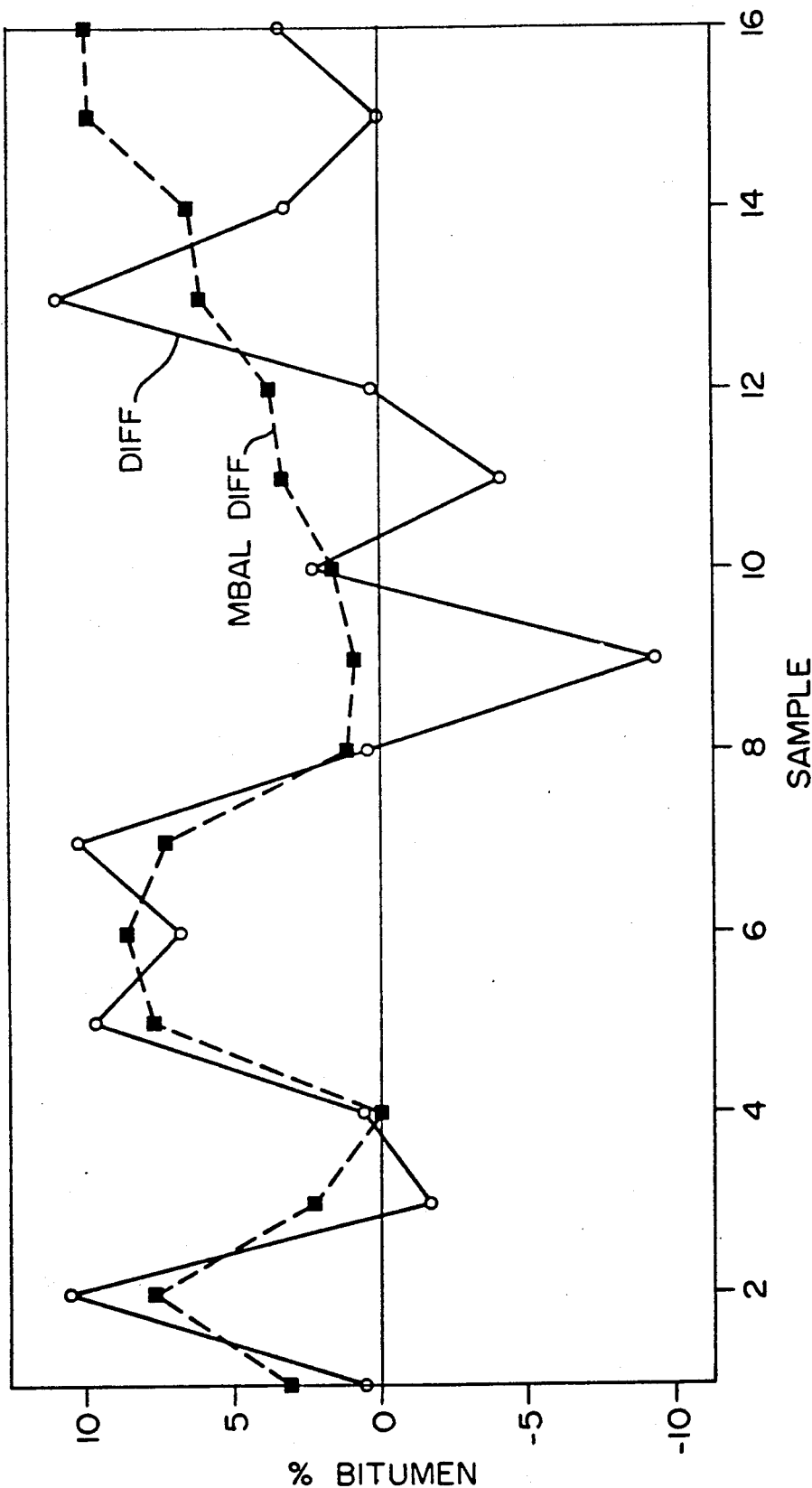

REDUCING THE WATER AND SOLIDS CONTENTS OF BITUMEN FROTH MOVING THROUGH THE LAUNDER OF A SPONTANEOUS FLOTATION VESSEL

FIELD OF THE INVENTION

This invention relates to a process and apparatus for improving the quality of bitumen froth produced by spontaneous flotation in the course of extracting bitumen from oil sands using the hot water process. More particularly it relates to separating water and solids from bitumen froth, to thereby clean and upgrade the froth.

BACKGROUND OF THE INVENTION

Bitumen (a form of heavy oil) is commercially recovered from oil sand in Alberta. This recovery is achieved by mining the oil sand, extracting the bitumen from the oil sand in the form of froth, cleaning the froth product to remove contained water and solids, and upgrading the bitumen to produce a variety of oil products. Extraction is achieved using a process referred to in the industry as the hot water process. This process is described in considerable detail in prior art patents and in the technical literature. A short summary of the process is given below.

To better understand the hot water process, it is helpful to know about the nature of oil sand itself. Oil sand comprises grains of sand which are individually sheathed or wetted with a very thin layer of connate water. Small flecks of bitumen are located in the interstices between the water-wet grains. Minute clay particles (termed "fines") are dispersed in the connate water phase.

In general, the hot water process involves slurrying the as-mined oil sand in hot water with surfactant-forming caustic and relying on a combination of heating, agitation, and surfactant actions to disperse the bitumen from the solids and into the aqueous phase of the slurry. At this point, bitumen flecks coalesce and some become attached to air bubbles, so that the aerated bitumen floats as a froth. The froth is then recovered.

The composition of the as-mined oil sand is variable. The oil, water and solids contents of oil sand processed at applicants' plant can typically vary as follows:

TABLE I

| oil: | 6 to 18% by wt. |
|---|---|
| water: | 0 to 14% by wt. |
| fines (−44 u) | 10 to 75% by wt. |
| total solids: | 70 to 90% by wt. |

This variability in composition leads to wide swings in the processability of the feed when using the hot water process. A "rich" oil sand, high in oil and low in fines, will give a high yield of good quality extraction product; a "lean" oil sand, low in oil and high in fines, will give a relatively low yield of relatively poor quality product. By way of example, Table II sets forth typical values for the composition of oil sand feed, for rich and lean ores of sufficient quality to be processed, and the recovery and composition of the primary froth product which one would typically obtain.

TABLE II

| Lean Oil Sand: | | Percent Oil Recovered As: | |
|---|---|---|---|
| Oil | 6% | Primary Froth | 65% |
| Water | 11% | Froth Composition: | |
| Fines | 21% | Oil | 55% |
| Solids | 83% | Water | 34% |
| | | Solids | 11% |
| Rich Oil Sand: | | Percent Oil Recovered As: | |
| Oil | 12% | Primary Froth | 92% |
| Water | 3% | Froth Composition: | |
| Fines | 14% | Oil | 65% |
| Solids | 85% | Water | 27% |
| | | Solids | 8% |

One of the disadvantages of producing a froth product stream having such wide swings in its compositional make-up is that the downstream equipment has to be sized to accommodate the worst case. In addition, constantly adjusting the downstream processing for optimization involves difficulty.

So any simple and effective means for reducing the water and solids contents of the froth and smoothing out the froth composition variations, would be desirable.

At this point it is useful to provide a short description, in greater detail, of the hot water extraction process, as practised at the plant of the present assignees, to put the invention into context. The process involves:

Mixing as-mined oil sand with hot water and a small amount of NaOH in a rotating horizontal drum for a period of several minutes to produce an aqueous slurry of thick consistency. Steam is sparged into the slurry to develop an exit temperature of about 180° F. In this slurrying step, the lumps of oil sand are ablated, the bitumen flecks are heated and the NaOH reacts in situ with bitumen moieties to form surfactants. The bitumen flecks become liberated from the solids and are dispersed into the aqueous phase. In addition, air bubbles are entrained into the slurry. Some of the bitumen flecks coalesce and coat air bubbles;

The slurry is then diluted with additional hot water and is temporarily retained under quiescent conditions in a large, cylindrical, conical-bottomed, open-topped vessel referred to as a primary separation vessel (hereafter "PSV"). In the PSV, "spontaneous flotation" of the bitumen occurs. More particularly, buoyant bitumen floats to form an oily froth. This froth, (called "primary froth"), overflows the upper lip of the PSV and is conveyed away from the vessel in a downwardly sloping, broad channel, referred to as a launder. As the froth is forming in the PSV, the coarse solids settle and are discharged from the base of the vessel. This stream of coarse solids, associated with some water and a small amount of bitumen, is called "PSV tailings". Some residual, insufficiently buoyant oil remains in the watery main body of the PSV contents - this fluid is referred to as "PSV middlings". The PSV middlings and PSV tailings are combined and are fed into a vessel referred to as the tailings oil recovery vessel (hereafter "TORV"). This is a cone settler, into which the PSV middlings and tailings are fed and are caused to move outwardly and laterally from a central feed point. The feed is contacted from below by an upwelling aerated stream of PSV middlings. A second yield of bitumen froth forms and overflows the vessel rim and is conveyed away in a launder. In the vessel, the coarse solids settle, are concentrated in the narrowing lower end of the cone, and are discharged as tailings. (The TORV process is described in greater detail in U.S. Pat. No. 4,545,892.) The process occurring in the TORV is also characterized as spontaneous flotation;

As the last step in the extraction process, the middlings from the TORV are fed to a bank of induced flotation cells, in which the feed is vigorously sub-aerated and agitated and from which a third froth stream is recovered. This froth (termed "secondary froth") is cleaned by settling out some contained water and solids by temporarily retaining the mixture in a settling tank.

The various froth streams are combined, deaerated, diluted with naphtha, and then centrifuged, to remove contained water and solids. Centrifuging involves passing the deaerated and diluted froth through two stages of centrifugation, using roll and disc centrifuges.

As indicated, the various froth products (PSV, TORV and secondary) contain water and solids as contaminants. It is the concentration of these contaminants that can vary widely, depending on the grade of the oil sand originally fed to the process.

SUMMARY OF THE INVENTION

The present invention has been developed as a result of making the following observations:

That bitumen froth issuing from a flotation vessel, such as the PSV or TORV, contains discrete water particles ranging in size from microscopic flecks to pea-size globules;

That, when in a gently sloped channel or launder, some of the water particles migrate downwardly through the froth body and collect and coalesce along the bottom wall of the channel in the form of a discrete, water-rich layer, which additionally contains some settled solids.

Having observed this action, applicants have devised a system wherein:

The water-rich bottom layer is at least partly diverted through an aperture or outlet in the channel bottom wall and is temporarily retained in an upstanding container positioned beneath the channel;

In addition, a weir is positioned immediately downstream of the diversion aperture. The weir extends transversely across the channel and functions to keep a small head of the dirty water with its surface above the aperture;

Thus a column of fluid comprising upper and lower layers, having distinctive compositions and a discernible interface, is formed in the separator consisting of the combination of the weir and container. The upper layer is relatively clean bitumen froth, containing some water and solids, and the lower layer is mainly water containing solids and traces/ of bitumen;

The elevation of the interface is monitored; and

A variable pump, controlling the rate of withdrawal of fluid from the base of the container, is operated in response to the location of the interface so as to maintain the interface at a substantially constant pre-determined level.

In a preferred feature, means are provided for injecting make-up water into the lower end of the container chamber. In the event that good quality oil sand is being processed, the froth will contain solids but only a small quantity of water. In this circumstance, it would only be possible to drain water from the container at a slow rate, otherwise the oil/water interface would be lowered to an undesirable elevation. At such slow withdrawal rates, plugging with solids becomes a problem. By adding water to the mainly water layer in the container, as required, plugging can be avoided by maintaining a desirable rate of water withdrawal.

As a result of implementing the foregoing system, it has been found that the concentrations of water and solids in bitumen froth can be reduced in a simple manner.

DESCRIPTION OF THE DRAWINGS

FIG. 2 is a plot showing the bitumen content of sixteen samples of each of PSV and knock-out froth;

FIG. 3 is a plot using the same data as FIG. 2, but modified to account for predicted sampling error; and FIG. 4 is a comparative plot for sixteen samples, showing the improvement achieved in froth quality by using the invention.

DESCRIPTION OF THE PREFERRED EMBODIMENT

Figure 1:
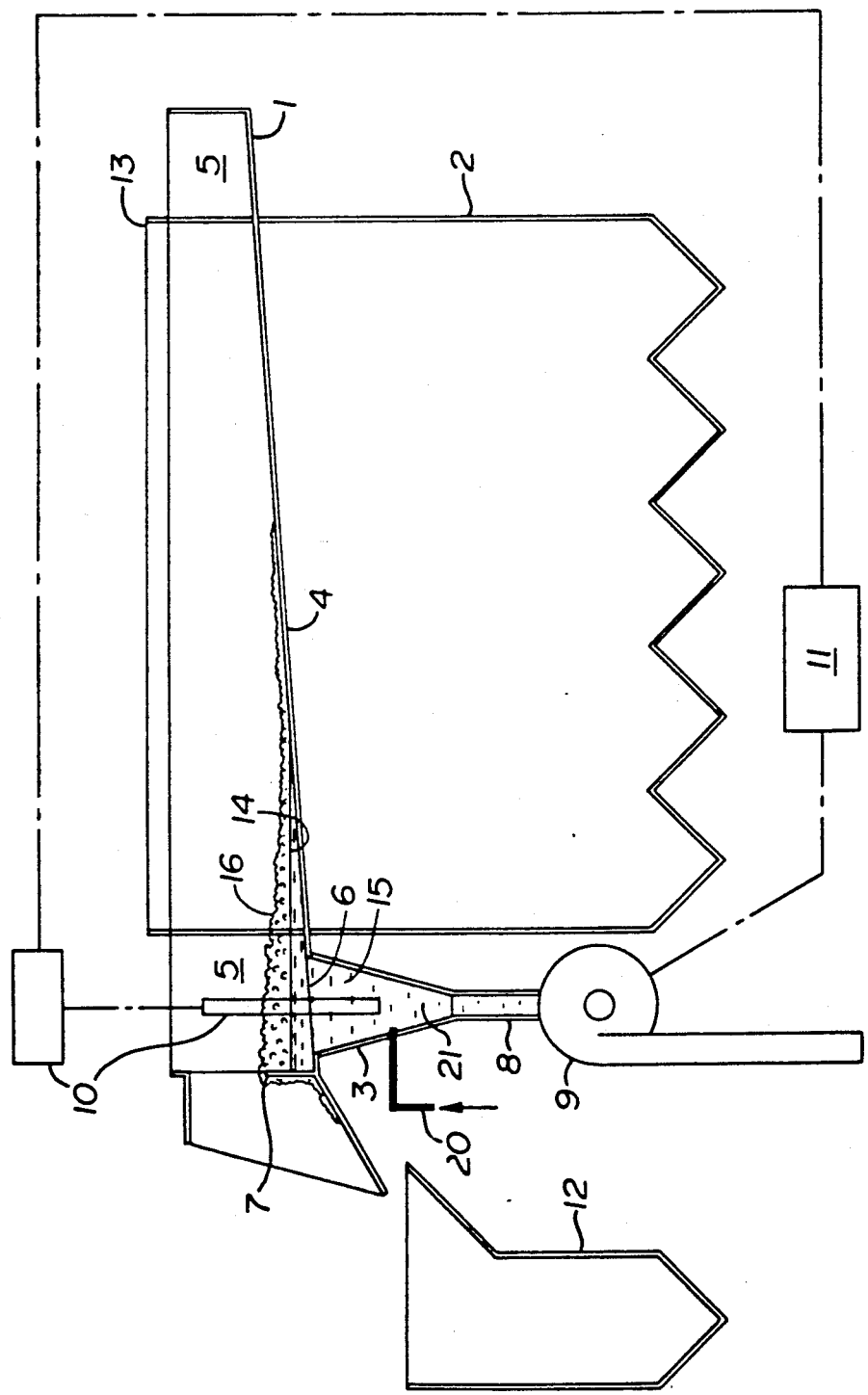
FIG. 1 is a side view, partly broken away, showing an assembly incorporating the invention, said assembly having been used on a pilot plant basis to test the system.

Having noted that free water was associated with bitumen froth flowing through the open-topped channel or launder 1 of a hot water process pilot plant spontaneous flotation vessel or PSV 2, a downwardly extending container 3 was attached to the bottom wall 4 of the launder. The container 3 communicated with the launder passageway 5 by means of an aperture 6. A transversely extending weir 7 was positioned across the passageway 5, immediately downstream of the aperture 6. The weir 7 and container 3 together formed a separator. The container 3 was equipped with a drain line 8 and a variable discharge Moyno[1] pump 9. A water line 20, connected with a water source (not shown), was provided to supply make-up water to the internal chamber 21 of the container 3, when required. The froth/water interface level 14 in the separator was monitored using an interface level sensor 10. Specifically, an Endress and Hauser FMC 480Z capacitance-type gauge was used. The pump 9 was controlled using a Bailey Network 90 control assembly 11 in response to the measurements taken by the sensor 10, to maintain the interface level 14 substantially constant. The cleaned froth 16 overflowing the weir 7 was collected in a weigh tank 12. Dirty water 15 collected in the chamber 21.

[1]Trade-Mark

Froth samples were collected at the lip 13 of the PSV 2 and at the weigh tank 12. The bottom discharge stream of dirty water from the container 3 was also sampled. Over 80 samples were analyzed for oil, water and solids. Mass balance periods of 20 minutes were conducted periodically. Mass flow rates of the three streams were obtained during these periods.

Sixteen complete sets of data were accumulated. FIG. 2 shows plots of quality (% bitumen) of both the PSV froth and the knock-out froth collected in the weigh tank 12.

The data showed that, while in most cases knock-out froth was improved relative to PSV froth, there were several samples where the quality had actually decreased. These unfavourable results were felt to be due to the highly variable quality of the froth, which changes composition from moment to moment. In addition, mass balances conducted on the separator did not exhibit mass closure.

In an effort to rationalize the results to achieve mass closure, the software program MATBAL[2], available from CANMET, was applied to the data. Measurement uncertainties were assigned, based on applicants' years of experience operating the pilot plant PSV. They were:

| Froth: | |
|---|---|
| bitumen - | 3.5% uncertainty |
| solids - | 10% uncertainty |
| Flowrates: | 1% uncertainty |

[2]Trade-Mark

The PSV froth and knock-out froth data, both modified using MATBAL, are plotted in FIG. 3. These rationalized results indicated that knock-out froth quality is always equal or superior to PSV froth quality, when the invention is practised.

The scope of the invention is set forth in the claims now following.

The embodiments of the invention in which an exclusive property or privilege is claimed are defined as follows:

1. In combination:
   a bitumen flotation vessel for recovering bitumen froth from an aqueous slurry of oil sand, said vessel having means for conveying produced froth away from the vessel, said means comprising a downwardly sloped channel having a bottom wall for conveying the froth stream, whereby the froth passing along the channel may form a stream and contained water and solids contaminants in the froth may concentrate in a bottom layer of dirty water forming part of the stream;
   means forming an aperture in the channel bottom wall, said aperture being positioned to divert the bottom layer of dirty water;
   a weir, extending transversely across the channel immediately downstream of the aperture, for temporarily retaining part of the froth;
   a container extending downwardly from the channel bottom wall, said container communicating at its upper end with the aperture, said container having a discharge outlet at its lower end, said container and weir combining to form a separator adapted to temporarily retain the stream sufficiently long so that it may form a bottom portion of dirty water and an upper cleaned froth portion, said portions having a discernible interface;
   a discharge line and variable pump means, connected with the container discharge opening, for removing dirty water from the container at a controlled rate;
   means for monitoring the elevation of the interface; and
   means for controlling the pump means in response to the interface elevation.

2. A method for reducing water and solids contaminant concentrations in hot water process bitumen froth produced in a flotation vessel, comprising:
   conveying the froth in a downwardly sloping, elongate channel extending from the vessel and having a bottom wall, whereby water and solids contained in the stream settle to form a bottom layer of dirty water;
   said channel having an aperture formed in its bottom wall and being associated with a container extending downwardly from the aperture and a weir extending transversely across the channel immediately downstream of the aperture, said container communicating at its upper end with the aperture and being connected at its bottom end with a discharge line and variable pump, said container and weir combining to form a separator;
   diverting at least part of the bottom layer of dirty water through the aperture into the container and temporarily retaining it therein;
   temporarily retaining part of the balance of the froth stream with the weir;
   whereby the fluid entering the separator forms an upper portion of relatively clean froth and a bottom portion of dirty water, said portions having a discernible interface;
   monitoring the level of the interface in the separator;
   pumping dirty water from the base of the container through the discharge line at a rate responsive to the elevation of the interface, to maintain the elevation of the interface substantially constant; and
   recovering froth overflowing the weir, said froth having a reduced water and solids content relative to the froth originally produced from the flotation vessel.

* * * * *